June 24, 1930.  W. BERG  1,766,276
JAW CHUCK FOR MACHINE TOOLS
Filed Dec. 16, 1927
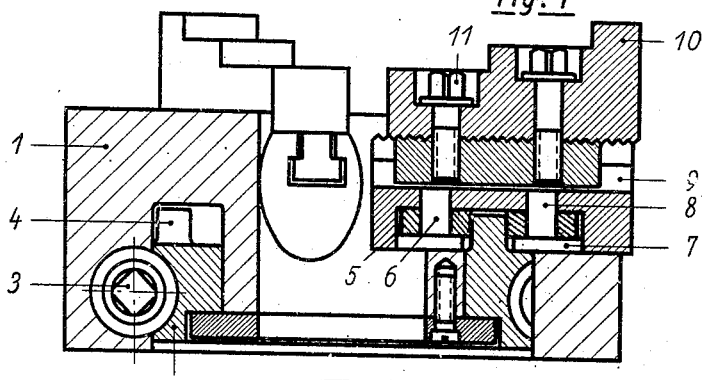
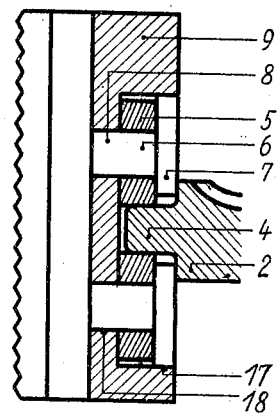
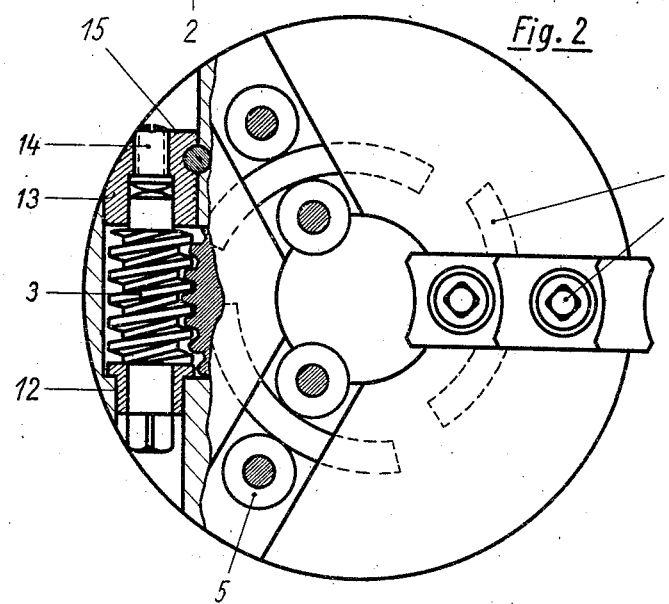
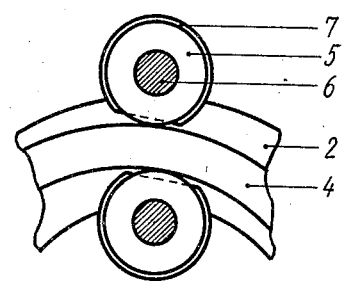
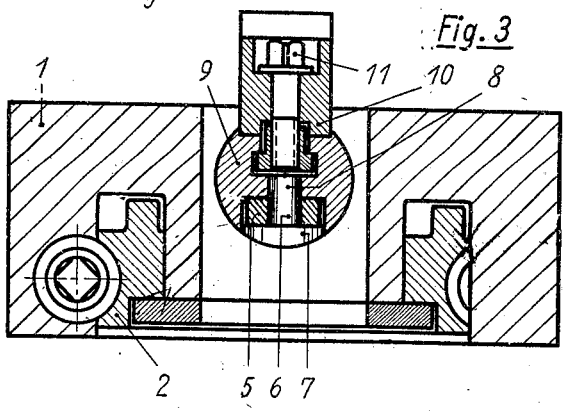

Patented June 24, 1930

1,766,276

UNITED STATES PATENT OFFICE

WILHELM BERG, OF BIELEFELD, GERMANY

JAW CHUCK FOR MACHINE TOOLS

Application filed December 16, 1927, Serial No. 240,501, and in Germany January 25, 1927.

This invention relates to the construction of a jaw chuck specially a chuck with three jaws for all kind of machine-tools and other machines. Chucks with radial adjustment of the jaws are equipped generally with cam-elements, arranged in the chuck pressing against other cams, studs or rollers on the lower side of the jaws. These elements are at present mounted only at one side, the free and projecting end touching the cam elements.

Jaw-chucks of this type were sufficient as long as the chucks were not submitted to great stress. At the great efficiency expected from modern machine-tools, especially when the working of the work is done with high speed, much feed or by several tools at the same time, the clamping power of the jaw chuck is as well known no longer sufficient. When considerable powers occur, the supporting parts mounted at one side, bend or break off.

As on the other hand the force of the workman to clamp the chuck is limited and cannot be increased, this human clamping force has to be better utilized so that the clamping effect of the chuck becomes greater. This object is obtained, according to the invention, by supporting the roller bolt on both ends. The roller itself is placed between these two roller bolt bearings, transmitting so the power movement of the cams by the roller, the roller bolt, the two roller bolt-bearings, the guide piece on the jaws. To keep the roller in position, one end of the roller bolt is formed as a collar. By this design the diameter of the roller bolt is kept very small, a bending or breaking of the roller bolt has become impossible, therefore the friction is reduced to the smallest amount possible with the result: the limited human power giving the maximum clamping power on the workpiece.

These guide-pieces were up to the present prismatic, wherefrom resulted a comparatively expensive working.

According to the invention, round rods are used as guide-pieces, flattened on the upper side to support the clamping jaws. The guide-pieces are formed simply by turning or grinding, and the chuck has cylindrical borings which require merely a quite simple working.

The round rod may be made of round iron and needs for sufficient precision merely to be ground.

An embodiment of the invention is illustrated, by way of example, in the accompanying drawing, in which:—

Fig. 1 is a longitudinal section showing the chuck.

Fig. 2 is a top-plan-view partly in section.

Fig. 3 is a cross-section showing the guide pieces and the jaws.

Fig. 4 is an enlarged view of cam, roller, and roller bolt supported on both ends by two bearings of the guide-piece, and Fig. 5 is a detail view.

The chuck consists of a body 1 in which a worm-wheel 2 is located which is rotated by a worm 3. The worm-wheel 2 carries the cams 4. The power movement of the cam 4 will be transmitted by the roller 5. The roller 5 is placed between two bearings 7 and 8 of the roller bolt 6. The two bearings 7 and 8 of the roller bolt 6 are parts of the guide-pieces supporting the roller bolt 6. To keep the roller 5 in position, one end of the roller bolt 6 is formed as a collar 7.

The rollers are preferably arranged in pairs, one on each side of the cam (Figs. 2 and 4), so that transmissions of great power are possible in both directions of movement. The clamping jaws 10 rest on the flat upper sides of the round rods 9 and are connected with these rods by screws 11.

In order to reduce the back lash of the chuck as much as possible and to take up well the worm-pressure, the worm 3 is journalled in two bushes 12 and 13. The bush 13 may have an adjustable counter-pressure-screw 14 by means of which the bearing for the worm can be regulated accurately. A safety pin 15 prevents the destruction of the important parts of the chuck in case of too high power of man or workpieces.

The body 1 of the chuck is made of a single piece of metal, the perimeter of which is of circular form, the same having a central bore or opening, and between the inner and thinner wall of the opening and the outer wall of the body there are a plurality of radial openings which are substantially circular, except where the openings extend through the face of the body, a portion of each of the openings being parallel and stepped to receive rods or slides 9. The body of the chuck is provided on one side with a stepped opening for the reception of bushings 12 and 13 for an endless screw or worm wheel 3 which is carried by the bushings, and one end of the screw or worm wheel is key-ended, the other end being convex to engage with a convex seat located in the aforesaid bore of the bushing for engagement with the convex end of the screw. The threads of the worm or screw 3 engage with a concave and threaded face of a ring 2 which has integral therewith cam flanges 4, the opposite edges of the flanges engaging rollers 5 which are mounted upon carrying pins 6 attached to the slides 9, said slides being adjustable by means of bolts 11 that connect the stepped and reversible jaws 10 to their respective slides.

The worm wheel 2 has on its side which is opposite to the jaws a recess in which is seated a ring that it attached to the body of the chuck by screws which enter apertures in the body located to one side of the recess in which the worm wheel is seated.

The bushing 13 is held in place by a fragile safety pin 15, and the opposite bushing 12 has a flange which impinges against a shoulder formed by a reduction of the aperture in which is seated the worm 3.

In use, when the worm is turned, the cams on the toothed gear will move the slides 9, said slides carrying with them the work clamping jaws, said jaws being adjustably connected to the members which are clamped in adjustable position upon their respective slides 9.

The construction provides for the reversal of the clamping jaws and for a change of position thereof relative to the slidable members.

I claim:

1. A jaw chuck for machine tools, comprising in combination a body having cylindrical borings, a worm-wheel, cams on said worm-wheel, and round rods serving as guide-pieces all accommodated in said chuck, clamping jaws on said guide pieces, connecting screws for said jaws, a roller bolt supported on both ends by two bearings in said guide piece carrying between said two bearings of said guide-piece the roller and formed on one end as a collar to support said roller, a worm for driving said worm-wheel, two bushings in said body, in which said worm is journalled, a counter-pressure-screw in one of said bushings and a safety pin connecting said bushing with said body.

2. A jaw chuck, comprising in combination a body (1), radial grooves on the one side of said body, guide-pieces (9) for the jaws received in said radial grooves, a circular groove on the other side of said body cutting into said radial grooves, a worm wheel (2) with a plurality of spaced apart eccentric flanges (4) located within said circular groove, rollers (5) on bearing-bolts (6) at both the ends of said guide-pieces, a worm-screw (3) to drive said worm-wheel and a disk supporting said worm wheel.

In testimony whereof I affix my signature.
WILHELM BERG.